United States Patent [19]

Blafford et al.

[11] 4,056,078
[45] Nov. 1, 1977

[54] AUTOMATIC DOG WASHER

[76] Inventors: Clem Blafford; Antoinette Blafford, both of 106 Bay 38th St., Brooklyn, N.Y. 11214

[21] Appl. No.: 711,308

[22] Filed: Aug. 3, 1976

[51] Int. Cl.² .................... A01K 29/00; A61D 11/00
[52] U.S. Cl. ........................................ 119/158; 119/19
[58] Field of Search .................. 119/1, 15, 19, 22, 33, 119/158, 159, 160

[56] References Cited

U.S. PATENT DOCUMENTS

| 257,596 | 5/1882 | Lea Mond | 119/1 |
|---|---|---|---|
| 990,126 | 4/1911 | Graefe | 119/160 |
| 1,714,635 | 5/1929 | Schäfer | 119/1 |
| 2,238,872 | 4/1941 | Mather et al. | 119/159 |
| 2,665,665 | 1/1954 | Jones | 119/159 |
| 3,749,064 | 7/1973 | Weinstein et al. | 119/158 |

*Primary Examiner*—Louis G. Mancene
*Assistant Examiner*—Robert P. Swiatek

[57] ABSTRACT

Dog cleaning apparatus includes first and second enclosures sharing a common sidewall. Water spray heads are positioned in the first enclosure and are adapted to selectively discharge streams of soapy and clear water. The second enclosure is provided with a blower for introducing a stream of heated air thereinto. A gate is mounted in the common wall between the two enclosures for selectively permitting the dog to leave the first enclosure to enter the second enclosure. Control mechanism is provided in the second enclosure for automatically activating the blower when the dog passes from the first enclosure to the second enclosure.

The shower enclosure is provided with opposed side walls, one of which is the common wall shared with the drying enclosure, and with top and rear walls. The top and rear walls are pivotably connected and the top wall is pivotably connected to the side wall opposite the common wall.

7 Claims, 5 Drawing Figures

U.S. Patent     Nov. 1, 1977     4,056,078
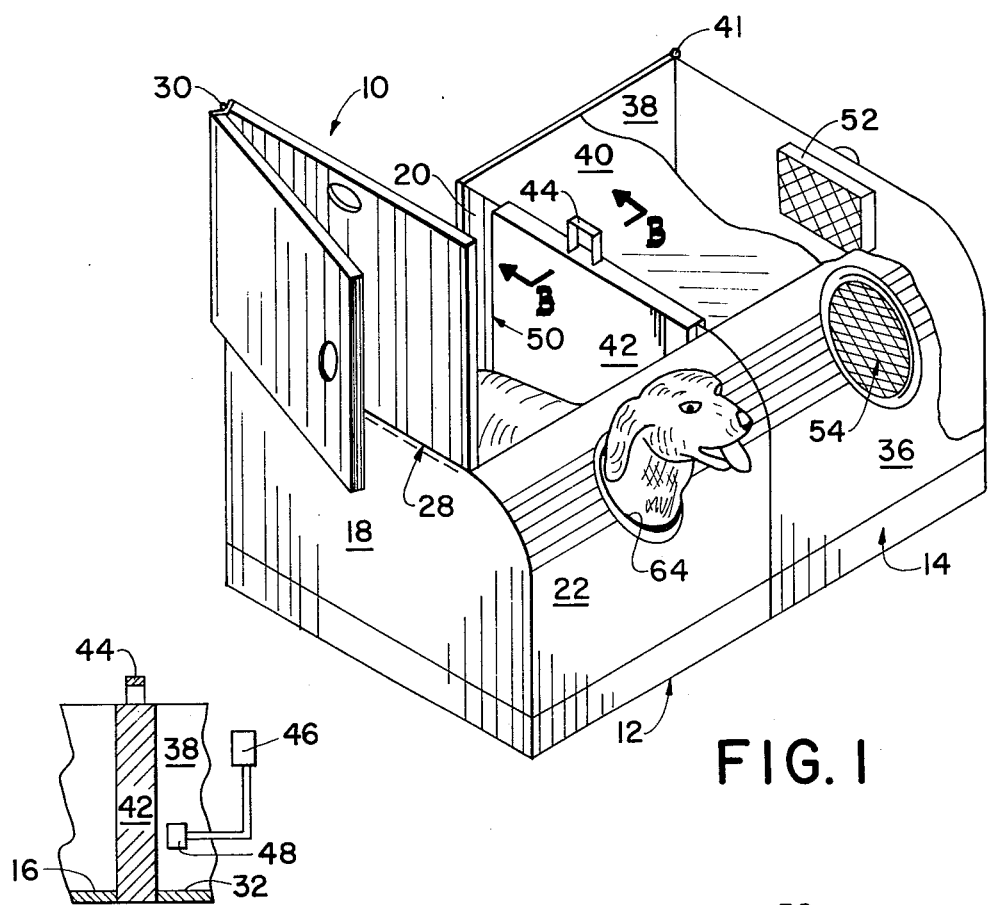
FIG. 1
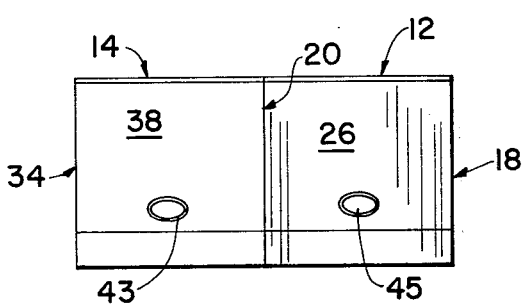
FIG. 5
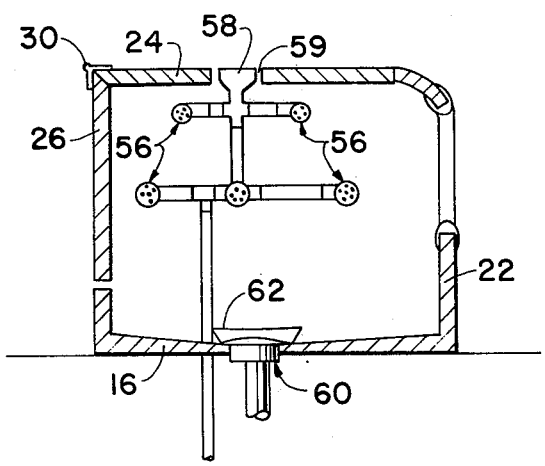
FIG. 4
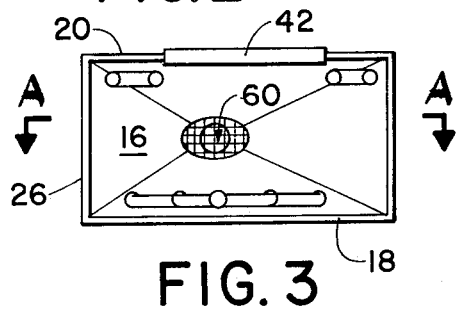
FIG. 2
FIG. 3

AUTOMATIC DOG WASHER

BACKGROUND OF THE INVENTION

The present invention relates to dog cleaning apparatus and more particularly to showering and air drying apparatus.

Animal cleaning apparatus in which an animal can be bathed or showered and thence dried by means of an air stream have been known heretofore. U.S. Pat. No. 3,884,191 issued May 20, 1975 to Pansy M. Stout, for example, discloses a housing in which spray heads are provided for washing the animal and which may be provided selectively with wash water or with air. However, it is not desirable to shower and dry the animal in the same enclosure since the efficacy of the drying equipment is minimized by the extremely high conditions of humidity which prevail in the housing following the washing sequence. On the other hand, it is undesirable to remove the animal from the housing while it is still wet since the animal in such conditions, generally shakes itself vigorously to remove the water from its coat and this results in the animal handler, the adjacent floor, walls and any others who may be in the vicinity being the recipient of the water shed by the animal. It would be best, therefore, to retain the animal within the apparatus until dried.

SUMMARY OF THE INVENTION

It is one object of the invention to provide animal cleaning apparatus wherein the animal can be showered and dried in a manner which does not adversely affect the efficiency of the drying equipment.

It is another object of the invention to provide animal showering and drying apparatus in which showering and drying are effected in separate areas and the drying equipment is actuated by the animal.

Other objects and advantages of the invention will become readily apparent from the following description of the invention.

According to the present invention there is provided dog cleaning apparatus comprising in combination: a first showering enclosure including a floor, opposed side walls, a front wall, and pivotably connected top and rear walls; a second drying enclosure including a floor, opposed side walls, one of the side walls being a common side wall of the first enclosure, and front, top and rear walls; water spray means mounted in the showering enclosure adapted to direct at least one stream of water onto an animal stationed therein; blower means mounted in the drying enclosure adapted to direct at least one stream of heated air onto an animal stationed therein; and a gate movably mounted in the common side wall for selectively providing communication between the showering and drying enclosures.

BRIEF DESCRIPTION OF THE DRAWINGS

In order that the invention may be more fully comprehended it will now be described, by way of example, with reference to the accompanying drawings, in which:

FIG. 1 is a perspective view, partly broken away, showing animal cleaning apparatus constructed in accordance with the invention;

FIG. 2 is a rear elevational view of the cleaning apparatus shown in FIG. 1 with the rear walls in their closed position;

FIG. 3 is a top plan view of the showering enclosure shown in FIG. 1 with the top wall removed to show the water spray head arrangement and the common side wall with the gate therein;

FIG. 4 is a side elevational view, in cross-section, of the showering enclosure shown in FIG. 3 taken along line A—A thereof; and FIG. 5 is a fragmentary elevational view of the common side wall and gate between the showering and drying enclosures shown in FIG. 1 taken along line B—B thereof and depicting the location of blower activating means within the drying enclosure.

DETAILED DESCRIPTION OF THE INVENTION

Referring to the drawings, there is shown animal cleaning apparatus 10 comprising a showering enclosure 12 and a drying enclosure 14. The showering enclosure includes a floor 16, side walls 18, 20, front wall 22 and top and rear walls 24, 26 which are pivotably connected. Desirably the top wall is pivotably connected to side wall 18 such as by means of a hinge 28 secured conjointly along the top edge of the side wall and a side edge of the top wall. The rear edge of the top wall is preferably given hinge 30 which is connected also to the upper edge of the rear wall. A double hinge connection as shown in FIG. 1 affords the capability of fully exposing the interior of the showering enclosure by pivoting both the top and rear walls. Such an arrangement is believed to facilitate placing of the animal in the showering enclosure.

The drying enclosure 14 comprises a floor 32, side walls 20, 34, front and rear walls 36, 38 and a top wall 40. The top and rear walls are preferably hingedly connected such as by means of a hinge 41 which connects the adjacent edges of the top and rear walls. A pull handle 43, similar to a pull handle 45 on the rear wall of the showering enclosure, enables manipulation of the rear and top walls when the dog is to be removed after completion of the drying period. The side wall 20 is common to both the showering and drying enclosures and, as can be seen most clearly from FIGS. 1 and 3, has mounted therein a door or gate 42. The gate is preferably a solid panel and may be slidably positioned in side wall 20. A handle 44 is desirably carried at the top of the gate to be manually grasped to lift the gate when the animal is to be moved or permitted to pass from the showering enclosure to the drying enclosure. Once the animal is within the drying enclosure the gate can be lowered while the drying operation is carried out. As shown in FIGS. 1 and 5, a blower device 46 is mounted in or on the wall 34 and is operably connected to control means 48 which may include a photo electric cell. Upon the animal passing through the opening 50 in side wall 20 and across the path of the photo electric cell the blower is activated and produces a stream of heated air which is discharged into the drying enclosure through a register 52. As will be understood, one or more of such registers may be positioned at locations within the drying enclosure so as to insure direction of the air streams along a path whereby the animal is dried. Although not shown it will be appreciated that the mounting of the registers within the drying enclosure may include deflector means for selective orientation of the air streams depending upon the size of the animal. A vent opening 54 is provided in one of the walls of the drying enclosure other than common wall 20 and such vent opening may be provided with a filter (not shown) to entrap loose hair prior to discharge from the enclosure.

As shown most clearly in FIGS. 3 and 4, the showering enclosure is provided with a plurality of water spray heads 56 which may be adjustable to permit the direction of the water spray along paths which will insure impingement upon the animal. One or more reservoirs 58 are desirably provided with access thereto through openings 59 in the top wall 24, such reservoirs being adapted to retain a quantity of an additive to be sprayed into the showering enclosure. Thus, the reservoirs may be used to mix a soap solution with the water for spraying onto the animal. Pesticides may be similarly applied to the dog during its washing sequence within the showering enclosure. It will also be appreciated that subsequent to the washing of the animal a disinfectant may be sprayed into the showering enclosure. This is of special value in the event the cleaning apparatus is to be employed in a commercial enterprise.

A drain 60 is positioned in the floor of the showering enclosure and may desirably include a lint trap 62. As shown in FIG. 4, the floor of the showering enclosure preferably is inclined towards the drain to insure proper drainage.

An opening 64 is provided in the front wall of the showering enclosure to receive the head of the animal. The provision of such an opening serves to allay the fears of the animal who might otherwise feel entrapped and isolated within the enclosure. Although no similar opening is provided in the drying enclosure, since it would tend to minimize the effect of the drying stream of air, one or more of the walls may be formed from a transparent material so as to provide visual communication with the outside.

As can be seen from FIG. 1, the showering and/or drying apparatus can be coin operated such as when the cleaning apparatus is to be utilized in a commercial enterprise. The construction and operation of coin actuable mechanisms is so well known that it is unnecessary to encumber the present specification with the details of such construction.

From the foregoing it will be seen that animal cleaning apparatus has been provided which enables the showering and drying of an animal in a manner which avoids the disadvantages of prior cleaning apparatus.

We claim:

1. Dog cleaning apparatus comprising in combination:
   a. a first showering enclosure including a floor, opposed side walls, a front wall, and pivotably connected top and rear walls;
   b. a second drying enclosure including a floor, opposed side walls, one of said side walls being a common side wall of said first enclosure, and front, top and rear walls;
   c. water spray means mounted in said showering enclosure adapted to direct at least one stream of water onto an animal stationed therein;
   d. blower means mounted in said drying enclosure adapted to direct at least one stream of heated air onto an animal stationed therein; and
   e. a gate movably mounted in said common side wall manually operable from a location externally of the showering and drying enclosures for selectively providing communication between said showering and drying enclosures, the top wall of said showering enclosure being pivotably connected to the side wall thereof remote from said common side wall and the rear wall of said showering enclosure being pivotably connected to the said top wall.

2. Dog cleaning apparatus according to claim 1, including control means in said drying enclosure for automatically actuating said blower means by the passage of an animal from said showering enclosure into said drying enclosure.

3. Dog cleaning apparatus according to claim 2, wherein said control means include photo electric cell means.

4. Dog cleaning apparatus according to claim 1, including reservoir means in association with said water spray means for the introduction of selected additive materials into said showering enclosure together with water.

5. Dog cleaning apparatus according to claim 1, wherein said showering enclosure is provided with a drain for conducting waste water away therefrom, said drain including a lint trap in association therewith.

6. Dog cleaning apparatus according to claim 1, wherein said gate is slidably mounted in said common wall.

7. Dog cleaning apparatus according to claim 1, wherein said drying enclosure includes an air vent in one of the walls thereof other than said common wall.

* * * * *